Sept. 14, 1926.
H. M. FUNNELL
UNIVERSAL JOINT
Filed Sept. 16, 1925
1,599,615
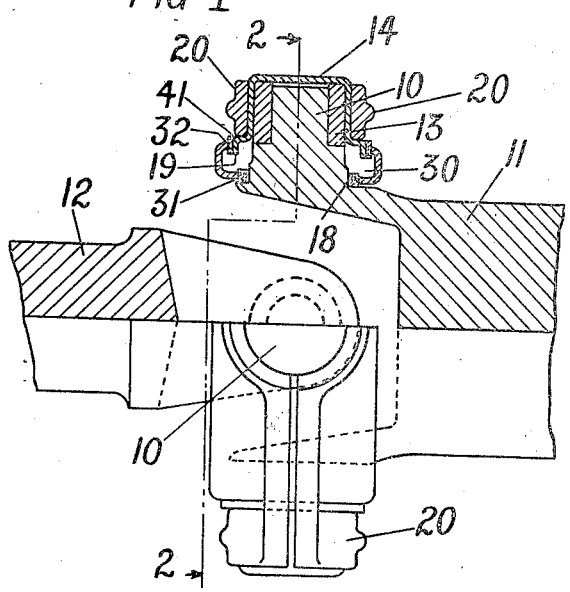
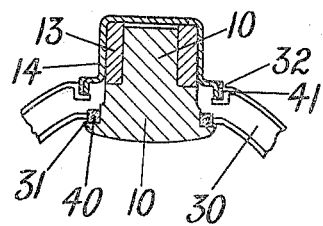
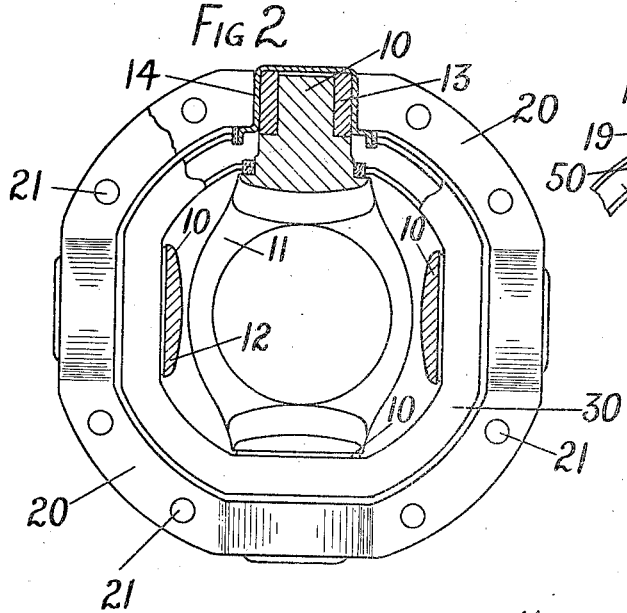
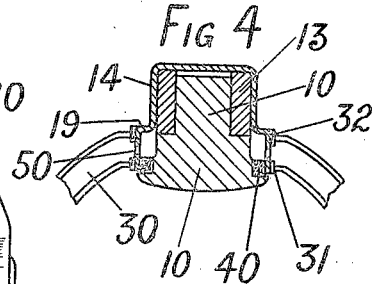
HARRY MAWSON FUNNELL.
INVENTOR
ATTORNEY Patented Sept. 14, 1926.

1,599,615

UNITED STATES PATENT OFFICE.

HARRY MAWSON FUNNELL, OF NEW MARKET, NEW JERSEY.

UNIVERSAL JOINT.

Application filed September 16, 1925. Serial No. 56,766.

My invention relates to universal joints used in automotive practice and more particularly to the torque ring and trunnion type and has for its object to produce a joint or coupling that is provided with a lubricant chamber in spaced relations with the torque ring so positioned that centrifugal force feeds the lubricant to the trunnions under pressure.

It has been common practice to include space in the torque rings for lubricant but this has not been found to be completely satisfactory because the severe strains of service often opens the torque ring and allows the lubricant to escape which causes the joint to run dry and the bearings to fail due to excessive heat.

One of the objects of this invention is to provide a lubricant chamber entirely separated from the torque ring so that it will not be subjected to strains tending to open the seams.

The foregoing and other features of my invention will now be described in connection with the accompanying drawings forming part of this specification in which I have represented my universal joint in its preferred form after which I shall point out more particularly in the claims those features which I believe to be new and of my own invention.

In the drawings:

Figure 1 is a side elevation, in part section, of my universal joint.

Figure 2 is a section along the broken line 2—2 Figure 1.

Figures 3 and 4 are modifications of details which I employ.

It will be observed that in illustrating the present invention I have taken a trunnion type universal joint of the kind in which the trunnions 10 are formed at the forked ends of terminal members 11 and 12 and in which the torque member is in the form of an annular ring 20.

The forked members 10 and 11 may be provided with any means for attaching to driving or driven members such as a flange, spline or hub as may be convenient or desirable for each particular installation.

The trunnions 10 are provided with bushings 13. Interposed between the bushing 13 and the torque ring I provide a cup shaped retainer 14 which is tightly held from turning by clamping together the two halves of the torque ring 20, which may be assembled by bolts or rivets 21.

Coaxial with, but entirely separate from the torque ring, I provide an annular lubricant chamber 30 comprising two annular halves and provided with four radial openings 31 on the inner circumference and four radial openings 32 on the outer circumference thereof. The halves of the lubricant containing chamber are joined together by welding or other suitable means. The holes 31 are adapted to interfit with shoulders 18 on the trunnions with a ring of packing 40 interposed therebetween to keep the joint tight. The holes 32 are adapted to interfit with extensions 19 of the retainer or housings 14 with a ring of packing 41 therebetween. These joints may be variously constructed as shown in the modified forms detailed in Figures 3 and 4. In Figure 4 the housing 14 is provided with an extension 19 that extends down through both radial openings in the ring 30 in which case holes 50 are provided through the walls so that a passage, for the lubricant, is provided to the trunnion bearings.

It will be observed that with this construction the lubricant is delivered to the bearings under pressure due to centrifugal force, and that because there are no joints in the housing which completely surround the bushing little or no oil is thrown off. This presents a joint that will have long service.

I wish it distinctly understood that my universal joint herein described and illustrated is in the form in which I desire to construct it but that changes or variations may be made as may be convenient or desirable without departing from the salient features of my invention and I, therefore, intend the following claims to cover such modifications as naturally fall within the lines of invention.

I claim:

1. A universal joint or shaft coupling comprising two forked heads having trunions provided with bushings, cup shaped members surrounding the bushings and ends of the trunnions and adapted to tightly hold the bushings from turning, a torque ring comprising two annular torque members provided with recesses adapted to clamp and securely hold the cup shaped members, an annular lubricant chamber coaxial with the torque ring and supported in spaced relations thereto by the cup shaped members; packing between the cup shaped members and the lubricant chamber and between the forked heads and the lubricant chamber.

2. A universal joint or shaft coupling of the torque ring and trunnion type comprising a torque ring in which the trunnions are journalled to oscillate, a separate annular lubricant containing reservoir located coaxial and entirely within the torque ring and which abuts the shoulders on the trunnions, cup shaped members extending from the lubricant reservoir through the torque ring and surrounding the said trunnions.

3. A universal joint or shaft coupling of the ring and trunnion type comprising a torque ring in which the trunnions are journalled to oscillate, a separate annular lubricant containing reservoir located entirely within the torque ring but external to the shoulders on the trunnions provided with radial openings through which said trunnions extend and which abuts the shoulders on the trunnions, cup shaped retainers surrounding the trunnions held from turning by the torque ring and provided with extensions which interfit with the radial openings of the lubricant chamber.

4. A universal joint or shaft coupling of the ring and trunnion type comprising a torque ring in which the trunnions are journalled to oscillate, an annular lubricant chamber coaxial with and located within the torque ring but external to the shoulders on the trunnions, means surrounding the journal and communicating with the lubricant containing reservoir whereby the trunnions are lubricated under pressure of centrifugal force.

In testimony whereof I affix my signature.

HARRY MAWSON FUNNELL.